(12) United States Patent
Tubel et al.

(10) Patent No.: US 6,442,105 B1
(45) Date of Patent: Aug. 27, 2002

(54) ACOUSTIC TRANSMISSION SYSTEM (75) Inventors: Paulo Tubel, The Woodlands; Luis Mendez, Houston; Albert A. Mullins, II, Humble, all of TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/133,748

(22) Filed: Aug. 13, 1998

Related U.S. Application Data (63) Continuation-in-part of application No. 08/599,323, filed on Feb. 9, 1996, now abandoned, which is a continuation-in-part of application No. 08/385,992, filed on Feb. 9, 1995, now Pat. No. 5,732,776.

(51) Int. Cl.[7] .................................................. H04H 9/00
(52) U.S. Cl. ........................ 367/82; 367/83; 340/854.3; 340/854.4
(58) Field of Search .................. 367/82, 83; 340/853.3, 340/854.3, 854.4, 854.5, 855.4

(56) References Cited

U.S. PATENT DOCUMENTS

| | | | |
|---|---|---|---|
| 3,219,107 A | 11/1965 | Brown, Jr. et al. | |
| 3,357,490 A | 12/1967 | Holmes | |
| 3,731,742 A | 5/1973 | Sizer et al. | |
| 4,073,341 A | 2/1978 | Parker | 166/65 |
| 4,125,163 A | 11/1978 | Fitzpatrick | |
| 4,150,721 A | 4/1979 | Norwood | |
| 4,337,653 A | 7/1982 | Chauffe | |
| 4,375,239 A | 3/1983 | Barrington et al. | 166/336 |
| 4,413,676 A | 11/1983 | Kervin | |
| 4,468,792 A * | 8/1984 | Baker et al. | 357/45 |
| 4,581,613 A | 4/1986 | Ward et al. | |
| 4,616,700 A | 10/1986 | Wood et al. | |
| 4,622,635 A | 11/1986 | Chandra et al. | |
| 4,633,954 A | 1/1987 | Dixon et al. | |
| 4,636,934 A | 1/1987 | Schwendemann et al. | |
| 4,649,550 A * | 3/1987 | Mount, II | 375/37 |
| 4,664,602 A | 5/1987 | Gordon | |
| RE32,463 E | 7/1987 | Westlake et al. | |
| 4,685,522 A | 8/1987 | Dixon et al. | |
| 4,712,613 A | 12/1987 | Nieuwstad | |
| 4,757,314 A | 7/1988 | Aubin et al. | |
| 4,788,545 A | 11/1988 | Farque | |
| 4,790,380 A | 12/1988 | Ireland | |

(List continued on next page.)

FOREIGN PATENT DOCUMENTS

| | | | |
|---|---|---|---|
| EP | 0 033 192 | | 8/1981 |
| EP | 0 388 315 | | 9/1990 |
| EP | 0 526 246 | | 2/1993 |
| EP | 0 533 526 | | 3/1993 |
| GB | 2 098 030 | * | 5/1982 |
| GB | 2 243 444 A | | 10/1991 |
| GB | 2 250 115 A | | 5/1992 |
| GB | 2 302 114 | * | 1/1997 |
| GB | 2 302 115 | * | 1/1997 |
| GB | 2 307 077 | * | 5/1997 |
| NO | 924017 | | 10/1992 |
| WO | US91/04878 | | 2/1992 |
| WO | US91/04879 | | 2/1992 |

*Primary Examiner*—Timothy Edwards, Jr.
(74) *Attorney, Agent, or Firm*—Cantor Colburn LLP (57) ABSTRACT

An acoustic transmission system is presented, wherein acoustic communication is transmitted over an acoustic medium comprising production tubing, well casing or over continuous tubing in a well (e.g., coil tubing, chemical injection tubing or dewatering string). More specifically, the acoustic medium has an acoustic tool associated therewith, which is permanently located downhole with the sensors and electromechanical devices typically employed in a well, and an acoustic tool associated therewith uphole. The downhole sensors are connected to the downhole acoustic tool for acoustic communication. The acoustic tool includes a piezo-electric ceramic transducer (i.e., a stack of piezoelectric elements) or an accelerometer for transmitting or receiving acoustic signals transmitting through the medium.

25 Claims, 10 Drawing Sheets

U.S. PATENT DOCUMENTS

| | | | |
|---|---|---|---|
| 4,796,699 A | 1/1989 | Upchurch | |
| 4,856,595 A | 8/1989 | Upchurch | |
| 4,886,126 A | 12/1989 | Yates, Jr. | |
| 4,896,722 A | 1/1990 | Upchurch | |
| 4,915,168 A | 4/1990 | UpChurch | |
| 4,921,048 A | 5/1990 | Crow et al. | |
| 4,922,423 A | 5/1990 | Koomey et al. | |
| 4,971,160 A | 11/1990 | Upchurch | |
| 4,989,670 A | 2/1991 | Lamp | |
| RE33,690 E | 9/1991 | Adams, Jr. et al. | |
| 5,050,675 A | 9/1991 | Upchurch | |
| 5,056,067 A | 10/1991 | Drumheller | |
| 5,124,953 A | 6/1992 | Grosso | |
| 5,127,477 A | 7/1992 | Schultz | |
| 5,128,901 A | 7/1992 | Drumheller | |
| 5,128,902 A | 7/1992 | Spinnler | |
| 5,132,904 A | 7/1992 | Lamp | |
| 5,147,559 A | 9/1992 | Brophey et al. | |
| 5,148,408 A | 9/1992 | Matthews | |
| RE34,111 E | 10/1992 | Wynn | |
| 5,152,343 A | 10/1992 | Kilgore | 166/242 |
| 5,172,717 A | 12/1992 | Boyle et al. | |
| 5,188,183 A | 2/1993 | Hopmann et al. | |
| 5,191,937 A | 3/1993 | Cook Sr. | |
| 5,222,049 A | 6/1993 | Drumheller | |
| 5,226,494 A | 7/1993 | Rubbo et al. | |
| 5,234,057 A | 8/1993 | Schultz et al. | |
| 5,260,660 A | 11/1993 | Stolarczyk | |
| 5,265,677 A | 11/1993 | Schultz | |
| 5,273,112 A | 12/1993 | Schultz | |
| 5,273,113 A | 12/1993 | Schultz | |
| 5,274,606 A | 12/1993 | Drumheller et al. | |
| 5,279,363 A | 1/1994 | Schultz et al. | |
| 5,283,768 A | 2/1994 | Rorden | |
| 5,293,551 A | 3/1994 | Perkins et al. | |
| 5,293,937 A | 3/1994 | Schultz, et al. | 166/250 |
| 5,318,130 A | 6/1994 | Manke | |
| 5,332,035 A | 7/1994 | Schultz et al. | |
| 5,332,048 A | 7/1994 | Underwood et al. | |
| 5,343,963 A | 9/1994 | Bouldin et al. | |
| 5,353,873 A | 10/1994 | Cooke, Jr. | |
| 5,358,035 A | 10/1994 | Grudzinski | |
| 5,413,174 A | 5/1995 | Schmidt | 166/250 |
| 5,425,420 A | 6/1995 | Pringle | 166/242 |
| 5,441,119 A | 8/1995 | Head | 175/74 |
| 5,477,505 A | 12/1995 | Drumheller | 367/82 |
| 5,517,593 A | 5/1996 | Nenniger et al. | |
| 5,533,572 A | 7/1996 | Brady et al. | 166/250.05 |
| 5,555,945 A | 9/1996 | Schultz et al. | 175/50 |
| 5,592,438 A | 1/1997 | Rorden et al. | 367/83 |

* cited by examiner

ACOUSTIC TRANSMISSION SYSTEM

CROSS REFERENCE TO RELATED APPLICATION

This application is a continuation-in-part of application Ser. No. 08/599,323 filed Feb. 9, 1996 now abandoned, which in turn, is a continuation-in-part of U.S. patent application Ser. No. 08/385,992, filed Feb. 9, 1995, (now U.S. Pat. No. 5,732,776).

BACKGROUND OF THE INVENTION

The present inventions relates to an acoustic system and method in a well. More specifically, the present invention relates to an acoustic system and method for acoustic communication over an acoustic medium comprising production tubing, well casing or over continuous tubing in a well (e.g., coil tubing, chemical injection tubing or dewatering string).

After an oil or gas well has been drilled it is completed. A completed hole includes a casing defining the hole with production tubing installed within the hole. Oil or other petroleum products are extracted via the production tubing, as is well known. Typically, the production tubing includes sensors and electromechanical devices located downhole for control of the production well. The sensors monitor downhole parameters (such as pressure, temperature, flow, gas influx, etc.). Examples of electromechanical devices include, e.g., a sliding sleeve or packer, a valve or start/stop a pump or other fluid flow device.

Communications uphole/downhole with the sensors and the electromechanical devices is generally accomplished over a wireline, as is well known in the industry. Another way of communicating is described in U.S. Pat. No. 5,283,768 ('768) assigned to the assignee hereof. The '768 patent discusses acoustic telemetry in the completion liquid in the annular space between the casing and the production tubing in a production well, i.e, the completion liquid is the acoustic transmission medium. The acoustic transducer disclosed in the '768 patent generates acoustic waves in the liquid.

SUMMARY OF THE INVENTION

The above-discussed and other drawbacks and deficiencies of the prior art are overcome or alleviated by the acoustic transmission system of the present invention. In accordance with the present invention, acoustic communication is transmitted over production tubing (the production tubing is the acoustic transmission medium) or over coil tubing in the production tubing. Preferably, a broad band communications technique is employed to ensure that any transmission is properly received.

A production well (i.e., completed well) is enclosed by a casing with a rig at the surface and has production tubing installed therein. The lower end of production tubing is perforated to provide a path for the flow of oil from the hydrocarbon bed up the center of the production tubing. A packer is provided to isolate this lower end from the upper portion of the well. Sensors are provided to monitor downhole parameters (such as pressure, temperature, flow, gas influx, etc.) and electromechanical devices include, e.g., a sliding sleeve or packer, a valve or pump or other fluid flow devices for control. Such sensors and/or electromechanical devices may be mounted downhole in the production well itself and/or incorporated into the production tubing, as are well known. A downhole acoustic communication tool in accordance with the present invention is permanently deployed downhole and is provided for acoustic telemetry. An uphole acoustic communication tool is provided for acoustically communicating with the downhole tool.

The downhole acoustic tool in accordance with a first embodiment, comprises a cylindrical mandrel having rotary connections the ends thereof. This tool, when installed in a production well, becomes part of the production tubing. An opening extends longitudinally through the mandrel permitting flow of oil or gas therethrough. The mandrel includes a plurality of machined cavities wherein the components of the tool are housed. A piezoelectric ceramic transducer (i.e., a stack of piezoelectric elements) is mounted in one of the cavities in a compressed state and in intimate contact with the mandrel for acoustic coupling therewith. Transformer coils, an electronic assembly and a battery pack assembly are mounted in another cavity. A sleeve is connected onto the mandrel by a rotary connection. The sleeve covers the cavities in the mandrel. A locking ring attached at another rotary connection and a shoulder sub are provided to secure the sleeve on the mandrel. The mandrel, if disposed downhole in a production string without the sleeve would subject the mandrel to high stresses, whereby the piezoelectric stack therein would be unloaded or over loaded resulting in poor acoustic coupling. The sleeve, by way of the rotary connections, absorbs much of these stress, whereby proper loading on the stack is maintained.

In accordance with a second embodiment, a coil tubing is extended down the opening of the production tubing. An uphole acoustic tool (e.g., an acoustic receiver, for example, an accelerometer) and a downhole acoustic tool (e.g., an acoustic transmitter, for example a piezoelectric device) are provided on coil tubing for acoustic telemetry in accordance with this alternate embodiment. It will be appreciated that two-way acoustic communication is within the scope of the present invention, e.g., piezoelectric transceivers uphole and downhole. It will further be appreciated that coil tubing is also employed while drilling a borehole, and acoustic telemetry as described herein may be applied such coil tubing. Also, the acoustic telemetry of the present invention, as applied to coil tubing, may be applied to other continuous tubing strings, e.g., chemical injection tubing, a dewatering string and the like. The downhole sensors are connected to the downhole acoustic tool for acoustic communication.

In accordance with a third embodiment, a downhole acoustic communication tool is provided for acoustic telemetry which is integral to casing. An uphole acoustic communication tool is provided for acoustically communicating over with the downhole tool.

The above-discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
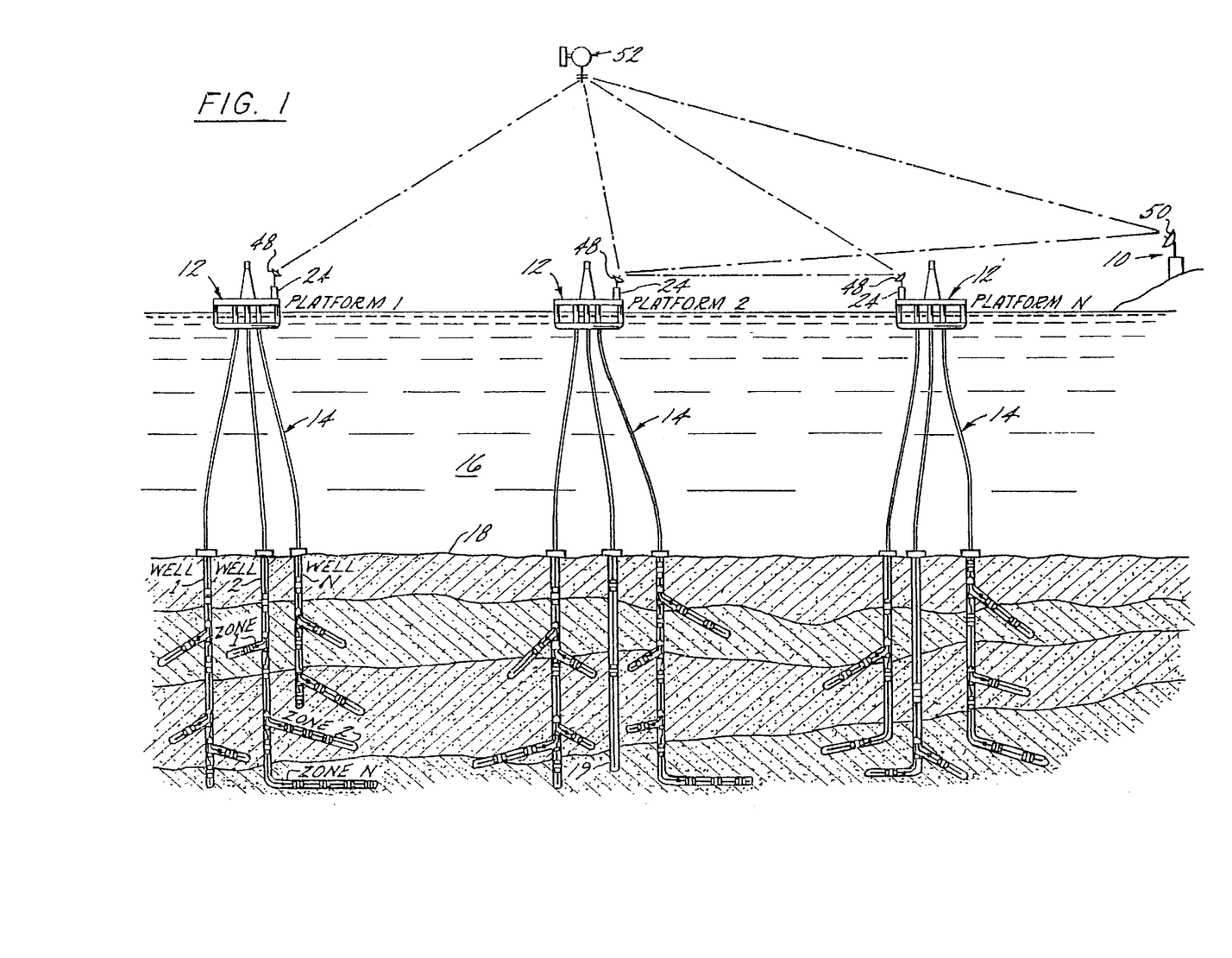
FIG. 1 is a diagrammatic view depicting the multiwell/multizone control system of the present invention for use in controlling a plurality of offshore well platforms.
Figure 2:
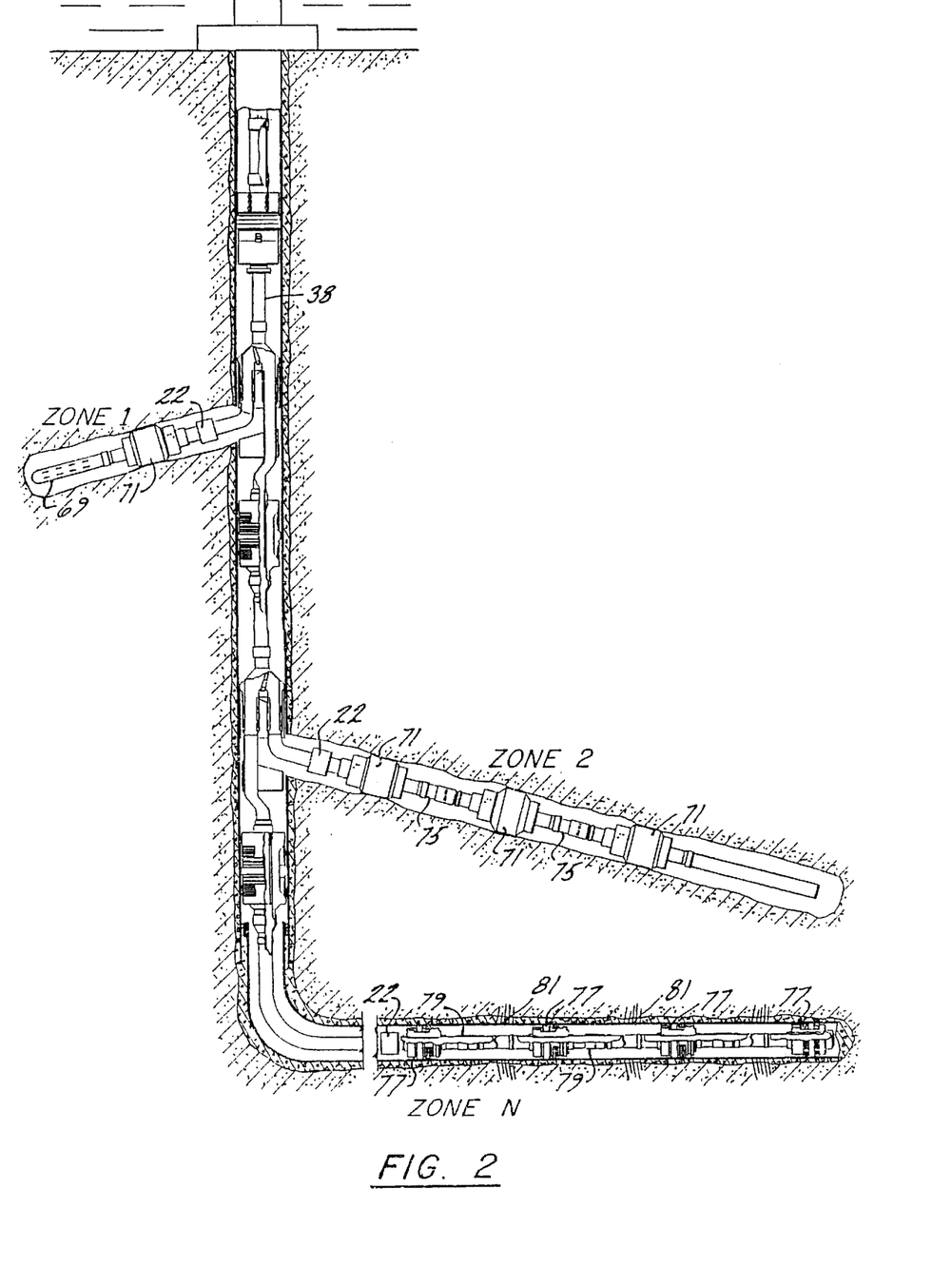
FIG. 2 is an enlarged diagrammatic view of a portion of FIG. 1 depicting a selected well and selected zones in such selected well and a downhole control system for use therewith.
Figure 3:
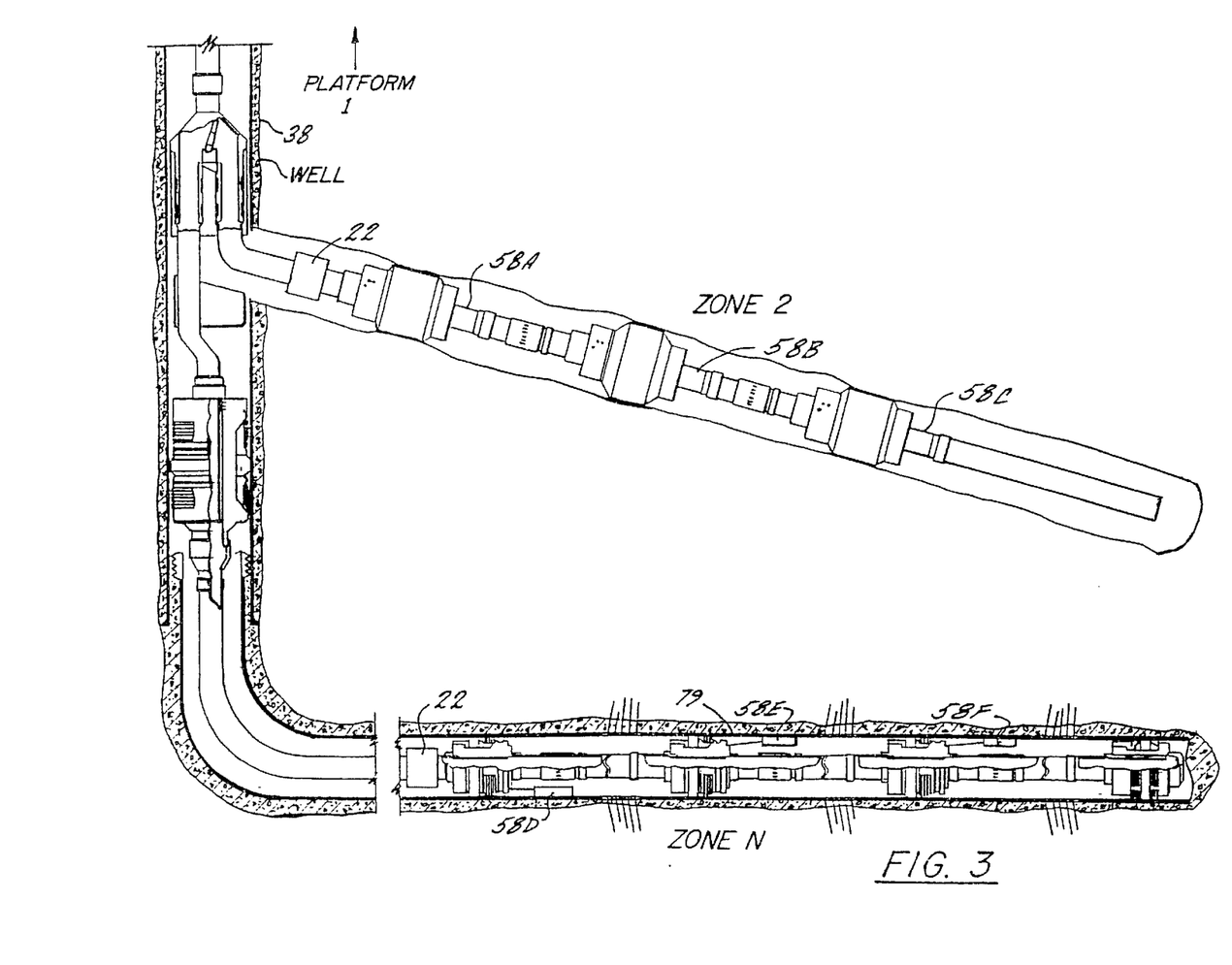
FIG. 3 is an enlarged diagrammatic view of a portion of FIG. 2 depicting control systems for both open hole and cased hole completion zones.
Figure 4:
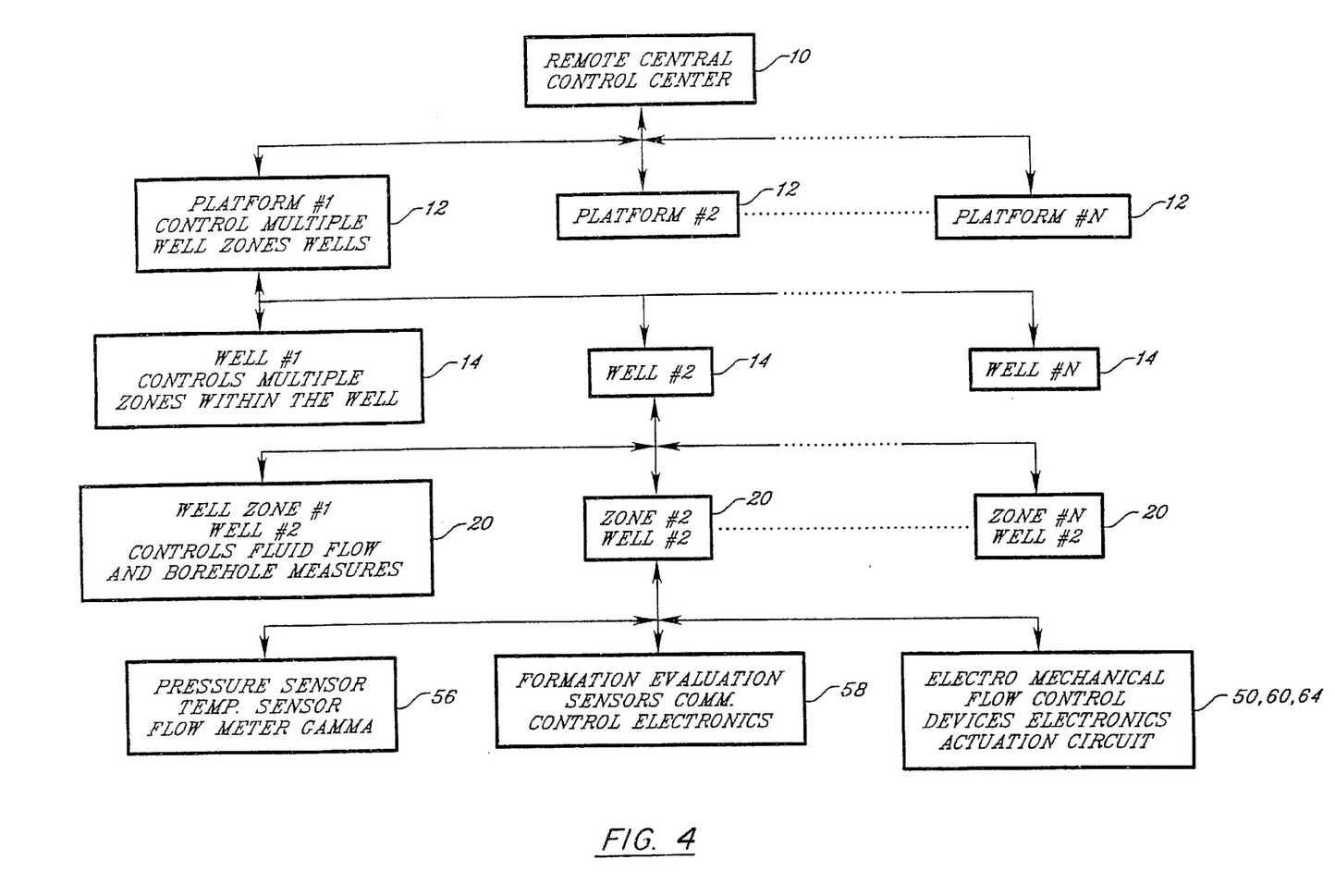
FIG. 4 is a block diagram depicting the multiwell/multizone control system in accordance with the present invention.

Referring now to FIGS. 1 and 4, the multiwell/multizone monitoring and control system of the present invention may include a remote central control center 10 which communicates either wirelessly or via telephone wires to a plurality of well platforms 12. It will be appreciated that any number of well platforms may be encompassed by the control system of the present invention with three platforms namely, platform 1, platform 2, and platform N being shown in FIGS. 1 and 4. Each well platform has associated therewith a plurality of wells 14 which extend from each platform 12 through water 16 to the surface of the ocean floor 18 and then downwardly into formations under the ocean floor. It will be appreciated that while offshore platforms 12 have been shown in FIG. 1, the group of wells 14 associated with each platform are analogous to groups of wells positioned together in an area of land; and the present invention therefore is also well suited for control of land based wells.

As mentioned, each platform 12 is associated with a plurality of wells 14. For purposes of illustration, three wells are depicted as being associated with platform number I with each well being identified as well number 1, well number 2 and well number N. As is known, a given well may be divided into a plurality of separate zones which are required to isolate specific areas of a well for purposes of producing selected fluids, preventing blowouts and preventing water intake. Such zones may be positioned in a single vertical well such as well 19 associated with platform 2 shown in FIG. 1 or such zones can result when multiple wells are linked or otherwise joined together. A particularly significant contemporary feature of well production is the drilling and completion of lateral or branch wells which extend from a particular primary wellbore. These lateral or branch wells can be completed such that each lateral well constitutes a separable zone and can be isolated for selected production. A more complete description of wellbores containing one or more laterals (known as multilaterals) can be found in U.S. Pat. Nos. 4,807,407, 5,325,924 and U.S. application Ser. No. 08/187,277 (now U.S. Pat. No. 5,411,082), all of the contents of each of those patents and applications being incorporated herein by reference.

With reference to FIGS. 1–4, each of the wells 1, 2 and 3 associated with platform 1 include a plurality of zones which need to be monitored and/or controlled for efficient production and management of the well fluids. For example, with reference to FIG. 2, well number 2 includes three zones, namely zone number 1, zone number 2 and zone number N. Each of zones 1, 2 and N have been completed in a known manner; and more particularly have been completed in the manner disclosed in aforementioned application Ser. No. 08/187,277. Zone number 1 has been completed using a known slotted liner completion, zone number 2 has been completed using an open hole selective completion and zone number N has been completed using a cased hole selective completion with sliding sleeves. Associated with each of zones 1, 2 and N is a downhole control system 22. Similarly, associated with each well platform 1, 2 and N is a surface control system 24.

As discussed, the multiwell/multizone control system of the present invention is comprised of multiple downhole electronically controlled electromechanical devices and multiple computer based surface systems operated form multiple locations. An important function of these systems is to predict the future flow profile of multiple wells and monitor and control the fluid or gas flow from the formation into the wellbore and from the wellbore into the surface. The system is also capable of receiving and transmitting data from multiple locations such as inside the borehole, and to or from other platforms 1, 2 or N or from a location way from any well site such as central control center 10.

Figure 5:
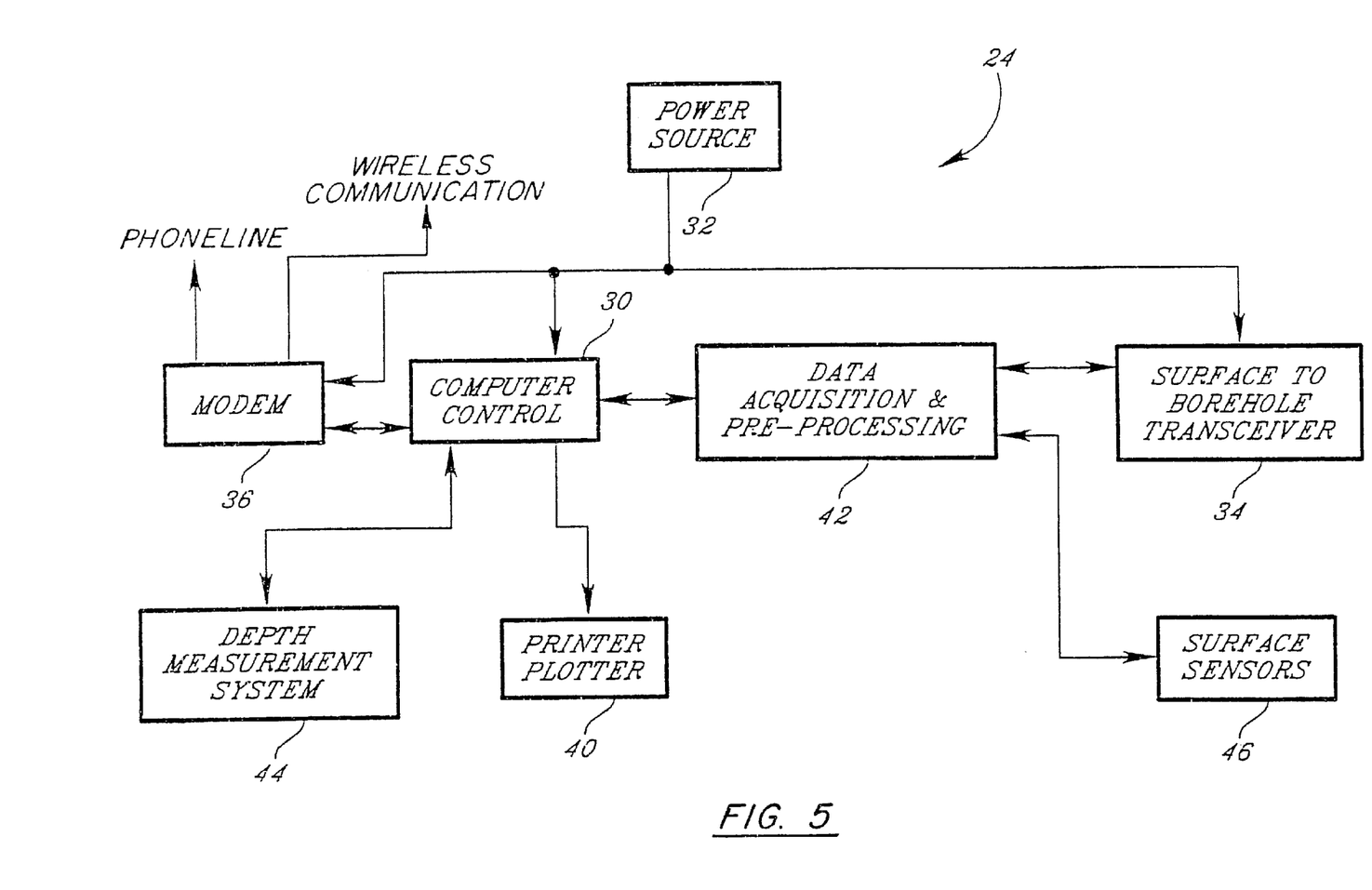
FIG. 5 is a block diagram depicting a surface control system for use with the multiwell/multizone control system of the present invention.

The downhole control systems 22 will interface to the surface system 24 using a wireless communication system or through an electrical wire (i.e., hardwired) connection. The downhole systems in the wellbore can transmit and receive data and/or commands to or from the surface and/or to or from other devices in the borehole. Referring now to FIG. 5, the surface system 24 is composed of a computer system 30 used for processing, storing and displaying the information acquired downhole and interfacing with the operator. Computer system 30 m ay be comprised of a personal computer or a work station with a processor board, short term and long term storage media, video and sound capabilities as is well know. Computer control 30 is powered by power source 32 for providing energy necessary to operate the surface system 24 as well as any downhole system 22 if the interface is accomplished using a wire or cable. Power will be regulated and converted to the appropriate values required to operate any surface sensors (as well as a downhole system if a wire connection between surface and downhole is available).

A surface to borehole transceiver 34 is used for sending data downhole and for receiving the information transmitted from inside the wellbore to the surface. The transceiver converts the pulses received from downhole into signals compatible with the surface computer system and converts signals from the computer 30 to an appropriate communications means for communicating downhole to downhole control system 22. Communications downhole may be effected by a variety of known methods including hardwiring and wireless communications techniques. A preferred technique transmits acoustic signals down a tubing string such as production tubing string 38 (see FIG. 2) or coiled tubing. Acoustical communication may include variations of signal frequencies, specific frequencies, or codes or acoustical signals or combinations of these. The acoustical transmission media may include the tubing string as illustrated in U.S. Pat. Nos. 4,375,239; 4,347,900 or 4,378,850, all of which are incorporated herein by reference. Alternatively, the acoustical transmission may be transmitted through the casing stream, electrical line, slick line, subterranean soil around the well, tubing fluid or annulus fluid. The transmission medium where the acoustic signal will travel in the borehole can be production tubing or coil tubing.

Figure 6:
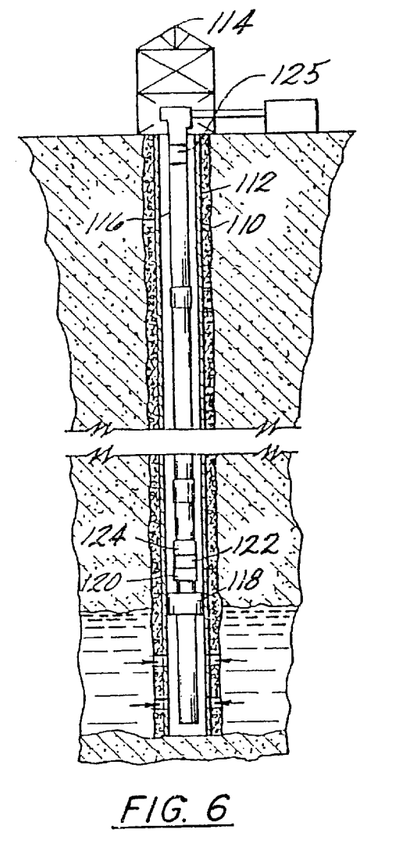
FIG. 6 is a diagrammatic elevation view of a production well employing an acoustic transmission system in accordance with the present invention.

Referring to FIG. 6, a production well (i.e., completed well) 110 enclosed by a casing 112 with a rig 114 at the surface is generally shown, such being well known in the art. Production tubing 116 is installed in well 110, also as is well known. The lower end of production tubing 116 is perforated to provide a path for the flow of oil from the hydrocarbon bed up the center of the production tubing. A packer 118 is provided to isolate this lower end from the upper portion of the well. Sensors 120 are provided to monitor downhole parameters (such as pressure, temperature, flow, gas influx, etc.) and electromechanical devices 122 include, e.g., a sliding sleeve or packer, a valve or pump or other fluid flow devices for control. Such sensors and/or electromechanical devices may be mounted downhole in the production well itself and/or incorporated into the production tubing, as are well known. A downhole acoustic communication tool 124 in accordance with the present invention is provided for acoustic telemetry. Acoustic tool 124 is constructed to operate over depths, pressures and temperatures commonly found in a downhole environment. An uphole acoustic communication tool 125 is provided for acoustically communicating with downhole tool 124, and may a similar type tool.

Figure 7:
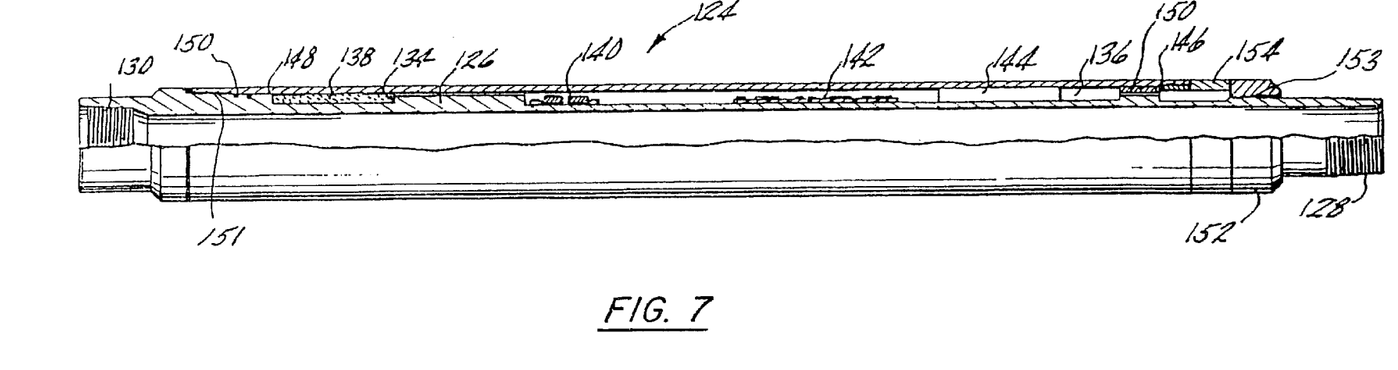
FIG. 7 is a side view partly in cross section of the downhole acoustic tool of the acoustic transmission system of FIG. 6.

Referring to FIG. 7, acoustic tool 124 comprises a cylindrical mandrel 126 having a male rotary connection 128 at one end thereof and a female rotary connection 130 at the other end thereof. Tool 124, when installed in a production well, becomes part of the production tubing 116. An opening or channel 132 extends longitudinally through mandrel 126 permitting flow of oil or gas therethrough. Mandrel 126 includes a plurality of machined cavities 134 and 136 wherein the components of the tool are housed. A piezoelectric ceramic transducer (i.e., a stack of piezoelectric elements) 138 is mounted in cavity 134 in a compressed state and in intimate contact with the mandrel for acoustic coupling therewith. Transformer coils 140, an electronic assembly (i.e., a printed circuit board) 142 and a battery pack assembly (preferably a pair of battery packs) 144 are mounted in cavity 136. It will be appreciated that the above described arrangement is only exemplary and the components of the tool can be housed in any number of cavities, e.g., each component could be mounted in a separate cavity. In the present example, coils 140 and circuit board 142 are connected to transducer 138 by wires that pass through a passageway (not shown) in the mandrel. Transformer coils 140, circuit board 142 and battery packs 144 are interconnected by wires (not shown) in cavity 136, and are connected to other tools in the product ion tubing by means of connectors 146 which are hard wired to the other tools through passageways, such being well known in the art, see, e.g., U.S. Pat. No. 5,144,126, entitled Apparatus For Nuclear Logging Employing Sub Wall Mounted Detectors and Electronics and Modular Connector Assemblies, assigned to the assignee hereof and which is expressly incorporated herein by reference. Further, other means of interconnecting tools, as many are well known, may be employed. A sleeve 148 is connected onto mandrel 126 by a rotary connection 151. Sleeve 148 covers cavities 134 and 136. A plurality of O-rings 150 are mounted within corresponding recesses in mandrel 126 and provide a seal between sleeve 148 and mandrel 126, thereby protecting the components of the tool from the harsh downhole environment. A locking ring 152 attached at rotary connection 153 and a shoulder sub 154 are provided to secure sleeve 148 on mandrel 126. Mandrel 126 if disposed downhole in a production string without sleeve 148 would subject the mandrel to high stresses, whereby stack 138 therein would be unloaded or over loaded resulting in poor acoustic coupling. Sleeve 148, by way of connections 151 and 153, absorbs much of these stress, whereby proper loading on the stack is maintained.

The piezoelectric stack 138 may be comprises of any of several known materials including piezoelectric crystalline materials or a suitable ferroelectric ceramic material such as lead zirconium titanate (PZT). Such known materials generate an electrical signal once a mechanical force such as vibration or stress is exerted onto the stack and exert a mechanical force when an electrical signal is applied to the stack.

Battery pack assembly 144 preferably comprises a dual battery pack which may be connected in series or parallel or one of the packs provides the downhole electrical power while the other pack is being recharged. The battery described herein is preferably a battery that has the ability to operate at high temperatures (above 175° C.), has a long operating life (as much as five years), is small in size (for example sized or otherwise adapted to fit within an envelope of 1" in diameter), has the ability for continuous discharge for instrumentation in microprocessors (10 milliamperes), has the ability for periodic discharge for communications equipment (15 milliamperes per minute at 2% duty cycle), has the ability for a minimum of 100 recharging cycles from external power sources as a generator, and includes high energy density and excellent self-discharge characteristics. Preferably, the battery comprises a solid lithium-metal polymer electrolyte secondary battery of the type described in the paper entitled "Large Lithium Polymer Battery Development: The Immobile Solvent Concept", M. Gauthier et al, the entire contents of which is incorporated herein by reference. Batteries of this type are also disclosed in U.S. Pat. Nos. 4,357,401; 4,578,326 and 4,758,483 all of the contents of which are incorporated herein by reference. It is believed that such lithium polymer battery cells are preferred over other battery technology such as nickel cadmium or lead acid due to the higher energy density, smaller size and better self discharge characteristics of the lithium polymer batteries. Still another battery which is believed to be especially useful in the present invention are those rechargeable batteries available from Duracell Inc. of Bethel, Connecticut which incorporate therein an integrated circuit chip for extending and/or optimizing the battery life, providing high energy density, high power and a wide temperature range for performance. Such batteries are sold by Duracell Inc. under the trade names DR15, DR17, DR30, DR35 and DR36.

Figure 8:
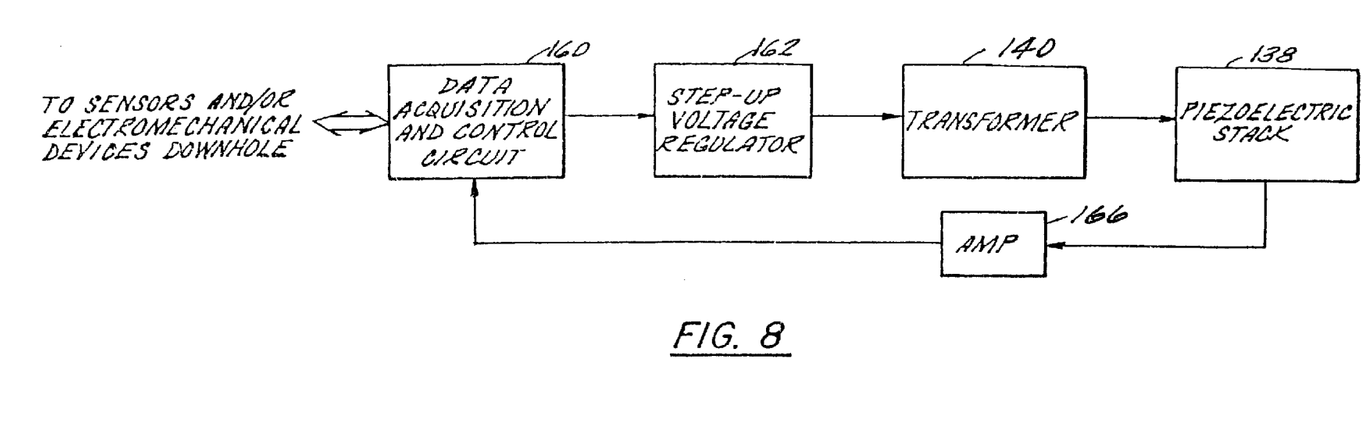
FIG. 8 is a schematic block diagram of the downhole acoustic tool of FIG. 7.

Referring to FIG. 8, the electronics assembly comprises a data acquisition and control circuit 160 which pre-processes data from the sensors 120, digitizes the pre-processed data, and process the data for transmission to the surface. The data acquisition and control circuit 160 is preferably a microprocessor based system (e.g., 32 KHz based processor system). Further, by way of example, the data acquisition circuit satisfies the following specifications: sample rate, 100 samples per second; channels, 8 analog channels and 1 frequency channel; and power consumption, 10 milliamps @ 5V. The electronics assembly preferably includes non-volatile memory (e.g., 64 KB) and 1 MB of RAM memory for storage of downhole software and the acquired data in the production well. Data signals to be transmitted to the surface are transmitted via acoustic telemetry (which includes both pulse mode and continuous wave transmission schemes). Acoustic telemetry is preferably at a data baud rate of at least 0.5 bits per second. A signal for transmission is stepped up in voltage by a step up voltage regulator 162 and the transformer to a voltage sufficient to cause the stack to induce an acoustic signal (e.g., an elastic wave which has an extensional motion along the axis of the production tubing/mandrel) in the mandrel which permeates uphole through the production tubing where it is detected at the surface. It will be appreciated that the batteries can be connected in series to increase the operating voltage or in parallel to provide a greater drive current. By way of example, 200 milliamps @ 50V is required to drive the transducer.

The stack 138 is also used for receiving acoustic data signals transmitted from the surface, whereby an acoustic signal (e.g., an elastic wave which has an extensional motion along the axis of the production tubing) which permeates downhole through the production tubing and imparts stresses: and tension on the stack resulting in an electronic signal. This signal is amplified by an amplifier 166 and then processed by the data acquisition and control circuit 160 to request information and/or to generate command/control signals for the sensors 120 and the electromechanical devices 122. It will be appreciated that the entire stack may not be required for receiving acoustic signals.

Figure 9:
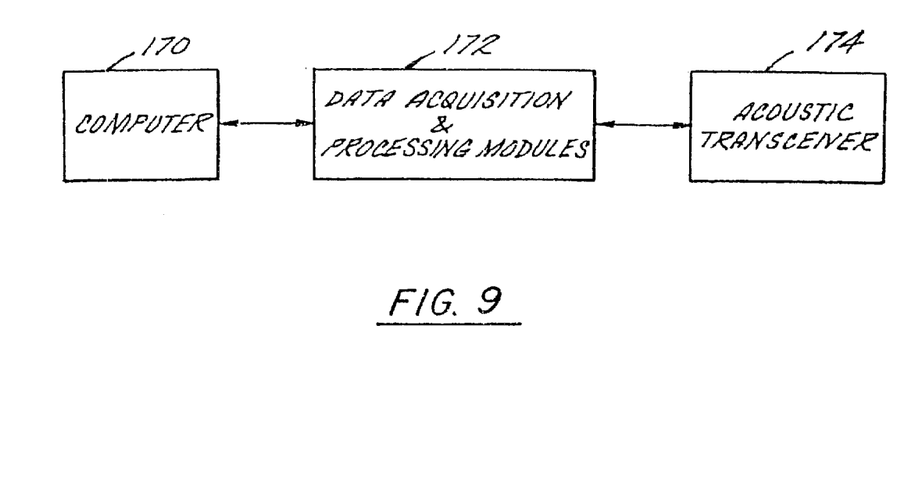
FIG. 9 is a schematic block diagram of the surface system of the acoustic transmission system of FIG. 6.

Referring to FIG. 9, at the surface, a computer 170 (e.g., a personal computer having 2 serial/1 parallel port, 8 MBytes of RAM and 250 MB of disk space) loaded with software and data acquisition and processing downhole modules 172 are employed. The software performs the control functions required for the transfer of data from the data acquisition module to the processor module and performs the data processing and background routines to assure that all tasks are executed in the proper priority sequence (e.g., decoding, display, and storage). Further, by way of example, the data acquisition module satisfies the following specifications: sample rate, 1 Kilo samples per second; channels, 8 analog channels, 4 digital channels and 1 frequency channel; and power consumption, 10 milliamps @ 5V. Surface. The software will also control the data exchange between the system and the operator (e.g., entering of the proper data processing parameters into the computer by the operator). The data acquisition and processing downhole modules 172 acquire the acoustic data transmitted from downhole using an acoustic transceiver 174, process the received data, utilizes the information to control operation of the production well, and/or display the information to an operator at the surface or platform. The data acquisition and processing downhole modules 172 also generates command signals which are transmitted downhole by acoustic transducer 174. Surface equipment further includes a phone or satellite based modem (e.g., a modem having a baud rate of 28.4 KBits per second) for transferring data between the production well site and a remote facility using phone lines, and/or satellite communication.

It will be appreciated that the use of the production tubing itself as the medium for acoustic telemetry is an important feature of the present invention.

The downhole acoustic telemetry of the present invention provides many features and advantages relative to the prior art. An important feature and advantage is that the present invention provides no obstructions within the production tubing. That is, the present invention provides acoustic telemetry while simultaneously maintaining production tubing obstruction free such that devices including coil tubing may be delivered through the production tubing without interruption. Further, while two-way acoustic communication is described above, one-way communication made be employed.

Figure 10:
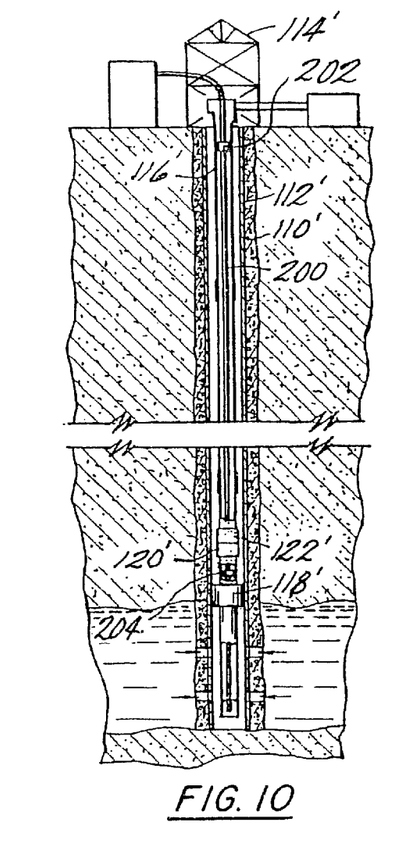
FIG. 10 is a diagrammatic elevation view of a production well employing an acoustic transmission system in accordance with an alternate embodiment of the present invention.

Referring to FIG. 10, a production well (i.e., completed well) 110' enclosed by a casing 112' with a rig 114' at the surface is generally shown, such being well known in the art. Production tubing 116' is installed in well 110', also as is well known. The lower end of production tubing 116' is perforated to provide a path for the flow of oil from the hydrocarbon bed up the center of the production tubing. A packer 118' is provided to isolate this lower end from the upper portion of the well. Sensors 120' are provided to monitor downhole parameters (such as pressure, temperature, flow, gas influx, etc.) and electromechanical devices 122' include, e.g., a sliding sleeve or packer, a valve or pump or other fluid flow devices for control. A coil tubing 200 is extended down the opening of the production tubing as is well known in the art. An uphole acoustic tool 202 (e.g., an acoustic receiver, for example, an accelerometer) and a downhole acoustic tool 204 (e.g., an acoustic transmitter, for example a piezoelectric device) are provided on coil tubing 200 for acoustic telemetry in accordance with this alternate embodiment. It will be appreciated that two-way acoustic communication is within the scope of the present invention, e.g., piezoelectric transceivers uphole and downhole. It will further be appreciated that coil tubing is also employed while drilling a borehole, and acoustic telemetry as described herein may be applied such coil tubing. Also, the acoustic telemetry of the present invention, as applied to coil tubing, may be applied to other continuous tubing strings, e.g., chemical injection tubing, a dewatering string and the like. Sensors 206 are also provided downhole on coil tubing 200 or in the production well or production tubing, as is also well known in the art. Sensors 206 are connected to acoustic tool 204 for telemetry uphole.

As described in the earlier embodiment, at the surface a computer loaded with software and a data acquisition and processing downhole modules are employed. The software performs the control functions required for the transfer of data from the data acquisition module to the processor module and performs the data processing and background routines to assure that all tasks are executed in the proper priority sequence (e.g., decoding, display, and storage). Surface equipment further includes a phone or satellite based modem for transferring data between the production well site and a remote facility using phone lines, and/or satellite communication.

The use of the coil tubing itself as the medium for acoustic telemetry is an important feature of the present invention.

Figure 11:
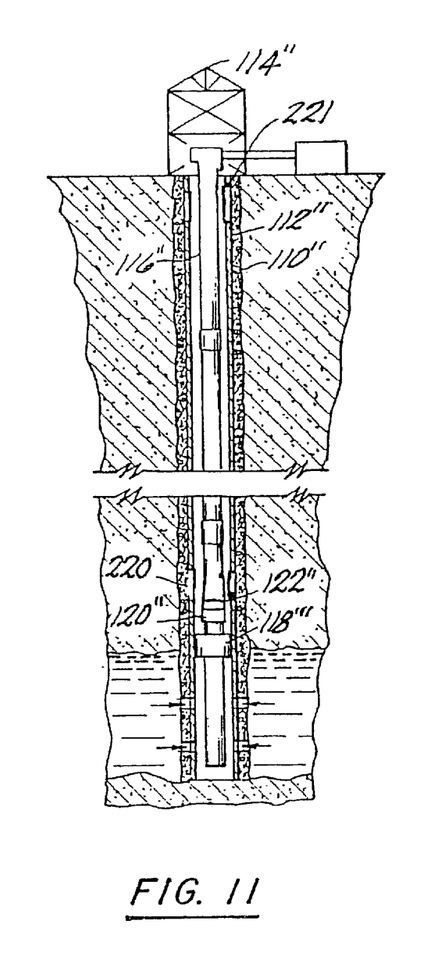
FIG. 11 is a diagrammatic elevation view of a production well employing an acoustic transmission system in accordance with another alternate embodiment of the present invention.

Referring to FIG. 11, a production well (i.e., completed well) 110" enclosed by a casing 112" with a rig 114" at the surface is generally shown, such being well known in the art. Production tubing 116" is installed in well 110", also as is well known. The lower end of production tubing 116" is perforated to provide a path for the flow of oil from the hydrocarbon bed up the center of the production tubing. A packer 118" is provided to isolate this lower end from the upper portion of the well. Sensors 120" are provided to monitor downhole parameters (such as pressure, temperature, flow, gas influx, etc.) and electromechanical devices 122" include, e.g., a sliding sleeve or packer, a valve or pump or other fluid flow devices for control. Such sensors and/or electromechanical devices may be mounted downhole in the production well itself and/or incorporated into the production tubing, as are well known. A downhole acoustic communication tool 220 in accordance with an alternate embodiment of the present invention is provided for acoustic telemetry. Acoustic tool 220 is integral to casing 112" and is constructed to operate over depths, pressures and temperatures commonly found in a downhole environment. Acoustic tool 220 similar to tool 124 (FIG. 7) with the exception that the rotary connections are attached to the casing whereby the tool forms a part of the casing with the opening therethrough forming part of the completed well. An uphole acoustic communication tool 221 is provided for acoustically communicating with downhole tool 220, and may a similar type tool.

The use of the casing itself as the medium for acoustic telemetry is an important feature of the present invention.

Figure 12:
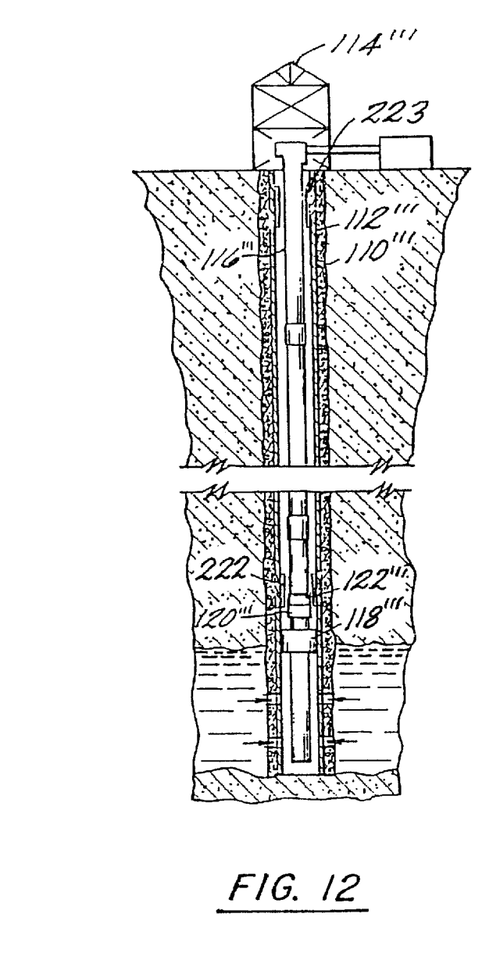
FIG. 12 is a diagrammatic elevation view of a production well employing an acoustic transmission system in accordance with still another alternate embodiment of the present invention.

Referring to FIG. 12, a production well (i.e., completed well) 110''' enclosed by a casing 112''' with a rig 114''' at the surface is generally shown, such being well known in the art. Production tubing 116''' is installed in well 110''', also as is well known. The lower end of production tubing 116''' is perforated to provide a path for the flow of oil from the hydrocarbon bed up the center of the production tubing. A packer 118''' is provided to isolate this lower end from the upper portion of the well. Sensors 120'41 are provided to monitor downhole parameters (such as pressure, temperature, flow, gas influx, etc.) and electromechanical devices 122''' include, e.g., a sliding sleeve or packer, a valve or pump or other fluid flow devices for control. Such sensors and/or electromechanical devices may be mounted downhole in the production well itself and/or incorporated into the production tubing, as are well known. A downhole acoustic communication tool 222 in accordance with an alternate embodiment of the present invention is provided for acoustic telemetry. Acoustic tool 222 is coupled to casing 112''', coupling of tools to the casing being well known in the art, and is constructed depths, pressures and temperatures commonly found in a downhole environment. Acoustic tool 222 is similar to tool 24 (FIG. 7) with the exception of the coupling to the casing whereby the opening through the tool forming part of the completed well. An uphole acoustic communication tool 223 is provided for acoustically communicating with downhole tool 222, and may a similar type tool.

Another important feature of the acoustic transmission system of the present invention is that such system is deployed permanently downhole and used in connection with a permanently deployed downhole control and monitoring system for controlling and monitoring the production of fluids in a well. The use of such a permanently deployed acoustic transmission system (as well as a permanently deployed downhole sensor and/or a permanently deployed downhole control and monitoring system) as used in the present invention is in distinct contrast to either conventional downhole sensors or conventional downhole control and monitoring systems (which may also utilize acoustic transmission systems) such as that described in the background section of the instant application, and which include the drill stem testing prior art disclosed in for example, the '168 patent to Upchurch, the '112 patent to Schulz and U.S. Pat. 5,293,937 to Schulz et al. It will be appreciated that the drill stem testing devices disclosed in the aforementioned prior art are used only on a temporary or semi-permanent basis for testing the well, that is, for determining optimum production rates. In no way does this prior art disclose a method or apparatus for acoustic transmission of data on a permanent basis, or the use of an acoustic transmission system which is deployed in connection with a permanently deployed downhole sensor or downhole control and monitoring system. Indeed, the present invention represents a significant advance in the art and describes a new generation of control and monitoring systems for production wells. No longer will human intervention on a production well be required on a continuing basis leading to enormous costs, lost time and lower production efficiencies. Similarly, no longer will well production efficiency be deleteriously affected due to the addition of water and other contaminants as the intelligent and downhole control system of this invention (as used in connection with a permanently deployed acoustic transmission system), will identify problems before they occur and allow for a solution to such problems without an interruption in the well efficiency or production. Thus, an important feature of Applicants' invention is that the acoustic transmission system be permanently disposed downhole for transmission to the surface and a permanently disposed downhole sensor and/or a permanently deployed downhole control and monitoring system.

Yet another important feature of the present invention is the use of a broadband communications technique for acoustic transmission of signals. It will be appreciated that acoustic wave communications from the surface or downhole through a downhole medium such as an production tubing, (i.e., steel tubing), or casing or coil tubing will have different resistances (attenuations) depending on the length of the tubing, casing or coil. Each section of tubing, casing or coil changes the impedance thereof causing some frequencies to travel without attenuation through the tubing, casing or coil while other frequencies will be so attenuated that such frequencies will be prevented from reaching the surface (or downhole as the case may be). In an attempt to deal with attenuation problems of this type, prior art systems such as disclosed in aforementioned U.S. Pat. No. 5,293,937 utilize costly repeaters and centralizers to overcome this problem. There are serious drawbacks and deficiencies however to the use of repeaters and centralizers, one of which is that such equipment causes the acoustic telemetry system to be extremely expensive. Moreover, the use of centralizers (which in effect allows the telemetry system to float within the well) is not suitable for a downhole production well due to the weight of the centralizers.

Figure 13:
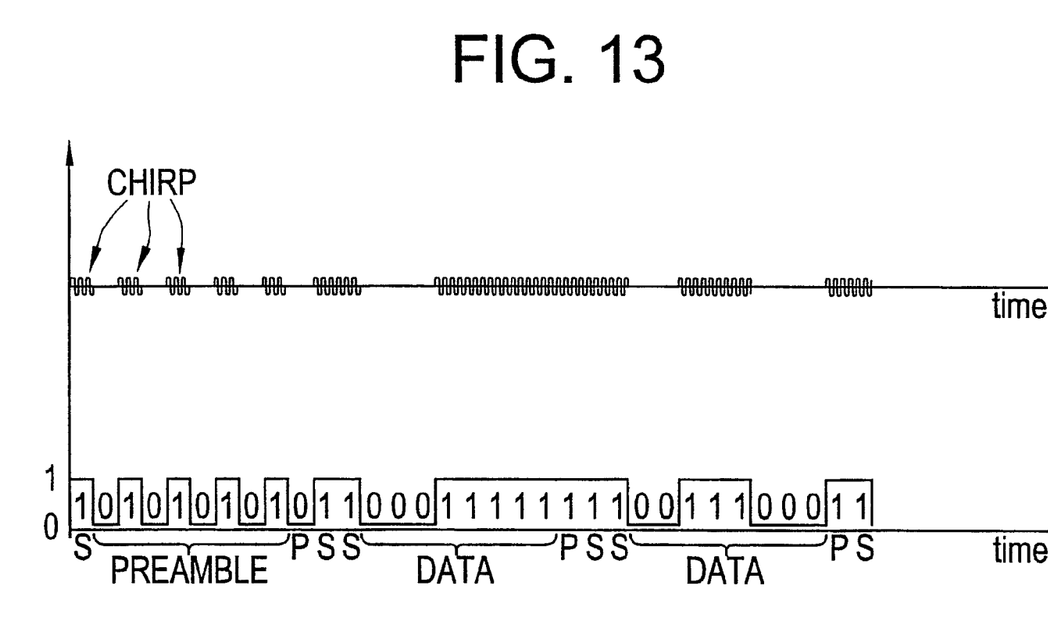
FIG. 13 is a timing diagram depicting the frequency sweeping method as applied for the broadband transmission technique.

In accordance with the broadband transmission technique of the present invention, the costly repeaters (and centralizers) associated with the prior art are eliminated. In accordance with this method, a range of frequencies which can travel through the tubing (or casing or coil) are transmitted to the surface (or downhole). In other words, a sweep is made of the frequencies of interest over a period of time for transmission through the tubing or the like. (See FIG. 13) This creates a digital code or bit. That is, each sweep of frequencies constitutes a bit of information and a complete message is then transmitted over a period of time. Since all of the frequencies contain all of the information being transmitted, and since at least one of the frequencies will ultimately reach the surface (or downhole), then the information intended to be transmitted will definitively be transmitted. Thus, it does not matter which of the frequencies ultimately reach the destination of transmission since any of the frequencies which are detected at the surface (or downhole) over the specific period of time will be processed as a bit of information and will provide the intended communication. This broadband transmission technique for communication will therefore guarantee that the information will be received at the destination regardless of attenuation characteristics of the tubing (or casing or coil) and without the need for costly repeaters as in the prior art.

The acoustic data transmitted using the above-described broadband transmission technique will be transmitted using the digital communications system described above and preferably involves sending a single command into, or up from, the wellbore. Preferably, the acoustic data will be a chirp (bit=1) or no chirp (bit=0). In one embodiment, a chirp will be an increasing frequency such as from 1145 Hz to 1250 Hz. Also preferably, the acoustic data will be transmitted in a format which includes a preamble word block and a data word block or blocks. In one embodiment, each block will consist of 11 bits, a start bit, 8 data bits, an Odd Parity bit, and a Stop bit. The data bits are arranged with the MSB first and LSB last. For example, if the data consists of a preamble of 55h and two words of data, 1Fh and 38h, the start and stop bits are 1 and the data transmitted would look as follows:

```
      PREAMBLE      DATA         DATA
    SDDDDDDDDPS SDDDDDDDDPS SDDDDDDDDPS
``` and the ones and zeros sent would be

10101010101100011111111100111100011 where each chirp (sweep up)=1, and no chirp=0

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. In a production well for producing petroleum fluids, the production well including production tubing running from the surface downhole to a production zone, the improvement comprising:

a downhole acoustic communications device permanently deployed downhole for transmitting or receiving acoustic signals using a plurality of longitudinal elements in a production well as the transmission medium, said acoustic signal being transmitted using a broadband communications technique wherein information to be transmitted is transmitted using a presence and an absence of a sweep of selected frequencies over a period of time which creates a digital bit=1 and a digital bit=0, respectively.

2. The production well of claim 1 wherein said plurality of longitudinal elements comprise production tubing.

3. The production well of claim 1 wherein said plurality of longitudinal elements comprise production well casing.

4. The production well of claim 1 wherein said acoustic communications device comprises:
a stack of piezoelectric elements.

5. The production well of claim 4 wherein said acoustic device comprises:
a processing circuit for generating transmit electrical signals for driving said piezoelectric elements and for processing receive electrical signals generated by said piezoelectric elements to receive acoustic signals.

6. The production well of claim 5 wherein said processing circuit comprises:

a data acquisition and control circuit for processing data or commands to be transmitted and generating said transmit electrical signals;

a step up voltage regulator for stepping up the voltage of said transmit electrical signals to generate stepped up transmit electrical signals and applying said stepped up electrical voltage signals to said piezoelectric elements; and a voltage amplifier for amplifying said receive electric signals and presenting said receive electric signals to said data acquisition and control circuit for processing data or commands received.

7. The production well of claim 6 wherein said data acquisition and control circuit comprises a microprocessor.

8. A production well for producing petroleum fluids comprising:

production tubing running from the surface downhole to a production zone;

at least one downhole sensor associated with said production tubing or said production well;

downhole acoustic device permanently deployed downhole for transmitting or receiving acoustic signals using the production tubing as the transmission medium, said downhole acoustic device in communication with said downhole sensor; and an uphole acoustic device for transmitting or receiving acoustic signals associated with said downhole acoustic device using the production tubing as the transmission medium;

said acoustic signal being transmitted using a broadband communications technique wherein information to be transmitted is transmitted using a presence and an absence of a sweep of selected frequencies over a period of time which creates a digital bit=1 and a digital bit=0, respectively.

9. The production well of claim 8 wherein:

said downhole acoustic device comprises a downhole processing circuit for generating downhole transmit electrical signals in response to signals received from said downhole sensor, said downhole transmit electrical signals for driving said downhole acoustic device, said downhole processing circuit for processing downhole receive electrical signals generated by said downhole acoustic device from received acoustic signals, said downhole receive electrical signals presented to said downhole sensor; and said uphole acoustic device comprises an uphole processing circuit for generating uphole transmit electrical signals, said uphole transmit electrical signals for driving said uphole acoustic device, said uphole processing circuit for processing uphole receive electrical signals generated by said uphole acoustic device from received acoustic signals.

10. The production well of claim 9 wherein:

said downhole processing circuit comprises, a data acquisition and control circuit for processing data or commands from said downhole sensor to generate said downhole transmit electrical signals, a step up voltage regulator for stepping up the voltage of said downhole transmit electrical signals to generate stepped up transmit electrical signals and applying said stepped up electrical voltage signals to said downhole acoustic device, and a voltage amplifier for amplifying said receive electrical signals and presenting said receive electric signals to said data acquisition and control circuit for processing data or commands received at said downhole acoustic device; and said uphole processing circuit comprises,
a data acquisition and processing circuit receptive to said uphole receive electrical signals for processing data or commands received, and
a computer having memory for storing programs for processing data commands from said data acquisition and processing circuit, said computer for generating data or commands to be processed by said data acquisition and processing circuit for generating said uphole transmit electrical signals.

11. The production well of claim 10 wherein said data acquisition and control circuit comprises a microprocessor.

12. The production well of claim 8 wherein said downhole acoustic device comprises:
a mandrel having at least one cavity formed therein, said mandrel having an opening longitudinally therethrough and having opposing ends for connection to said production tubing, whereby said acoustic tool forms part of said production tubing;
a piezoelectric transducer disposed within said at least one cavity wherein acoustic signals are coupled between said transducer and said mandrel;
an electronic assembly disposed within said at least one cavity for interfacing with said piezoelectric transducer; and
a sleeve disposed on said mandrel for covering said at least one cavity.

13. The production tool of claim 12 further comprising:
a battery pack disposed within said at least one cavity, said battery pack connected to said electronic assembly.

14. The production tool of claim 12 further comprising:
transformer coils disposed within said at least one cavity and connected to said piezoelectric transducer.

15. A production well for producing petroleum fluids comprising:
casing running from the surface downhole to a production zone;
at least one downhole sensor associated with said casing;
a downhole acoustic device permanently deployed downhole for transmitting or receiving acoustic signals using the casing as the transmission medium, said downhole acoustic device in communication with said downhole sensor; and
an uphole acoustic device for transmitting or receiving acoustic signals associated with said downhole acoustic device using the casing as the transmission medium, said acoustic signal being transmitted using a broadband communications technique wherein information to be transmitted is transmitted using a presence and an absence of a sweep of selected frequencies over a period of time which creates a digital bit=1 and a digital bit=0, respectively.

16. The production well of claim 15 wherein:
said downhole acoustic device comprises a downhole processing circuit for generating downhole transmit electrical signals in response to signals received from said downhole sensor, said downhole transmit electrical signals for driving said downhole acoustic device, said downhole processing circuit for processing downhole receive electrical signals generated by said downhole acoustic device from received acoustic signals, said downhole receive electrical signals presented to said downhole sensor; and
said uphole acoustic device comprises an uphole processing circuit for generating uphole transmit electrical signals, said uphole transmit electrical signals for driving said uphole acoustic device, said uphole processing circuit for processing uphole receive electrical signals generated by said uphole acoustic device from received acoustic signals.

17. The production well of claim 16 wherein:
said downhole processing circuit comprises,
a data acquisition and control circuit for processing data or commands from said downhole sensor to generate said downhole transmit electrical signals,
a step up voltage regulator for stepping up the voltage of said downhole transmit electrical signals to generate stepped up transmit electrical signals and applying said stepped up electrical voltage signals to said downhole acoustic device, and
a voltage amplifier for amplifying said receive electrical signals and presenting said receive electric signals to said data acquisition and control circuit for processing data or commands received at said downhole acoustic device; and
said uphole processing circuit comprises,
a data acquisition and processing circuit receptive to said uphole receive electrical signals for processing data or commands received, and
a computer having memory for storing programs for processing data commands from said data acquisition and processing circuit, said computer for generating data or commands to be processed by said data acquisition and processing circuit for generating said uphole transmit electrical signals.

18. The production well of claim 17 wherein said data acquisition and control circuit comprises a microprocessor.

19. The production well of claim 15 wherein said downhole acoustic device comprises:
a mandrel having at least one cavity formed therein, said mandrel having an opening longitudinally therethrough and associated with said casing;
a piezoelectric transducer disposed within said at least one cavity wherein acoustic signals are coupled between said transducer and said mandrel;
an electronic assembly disposed within said at least one cavity for interfacing with said piezoelectric transducer; and
a sleeve disposed on said mandrel for covering said at least one cavity.

20. The acoustic tool of claim 19 wherein said mandrel is connected to said casing to be integral therewith.

21. The acoustic tool of claim 19 wherein said mandrel is coupled to said casing.

22. In a well, the well including continuous tubing running from the surface downhole, the improvement comprising:
a downhole acoustic communications device permanently deployed downhole for transmitting or receiving acoustic signals using the continuous tubing as the transmission medium, said acoustic signal being transmitted using a broadband communications technique wherein information to be transmitted is transmitted using a presence and an absence of a sweep of selected frequencies over a period of time which creates a digital bit=1 and a digital bit=0, respectively.

23. The well of claim 22 wherein said continuous tubing comprises coil tubing.

24. The well of claim 22 wherein said continuous tubing comprises chemical injection tubing.

25. The well of claim 22 wherein said continuous tubing comprises dewatering tubing.

* * * * *